United States Patent [19]

Gaiser

[11] Patent Number: 4,595,243
[45] Date of Patent: Jun. 17, 1986

[54] DECELERATION AND PRESSURE SENSITIVE PROPORTIONING VALVE

[75] Inventor: Robert F. Gaiser, Stevensville, Mich.

[73] Assignee: Allied Corporation, Morristown, N.J.

[21] Appl. No.: 649,244

[22] Filed: Sep. 10, 1984

[51] Int. Cl.$^4$ ............................................. B60T 17/04
[52] U.S. Cl. ..................................... 303/6 C; 60/591; 303/24 A
[58] Field of Search ................. 60/564, 591; 303/6 C, 303/22 R, 24 R, 24 A, 24 C, 24 F

[56] References Cited

U.S. PATENT DOCUMENTS

| 2,957,728 | 10/1960 | Hill | 303/24 A X |
|---|---|---|---|
| 3,368,350 | 2/1968 | Cripe | 60/564 |
| 3,721,473 | 3/1973 | Budzich | 303/6 C |
| 3,790,221 | 2/1974 | Fulmer | 303/6 C |
| 4,205,883 | 6/1980 | Gaiser | 303/24 F |
| 4,356,694 | 11/1982 | Koshimizu et al. | 60/562 |
| 4,477,123 | 10/1984 | Schnürer | 303/24 R |

FOREIGN PATENT DOCUMENTS

| 0075391 | 3/1983 | European Pat. Off. |
| 0073722 | 3/1983 | European Pat. Off. |
| 0089478 | 9/1983 | European Pat. Off. |
| 0111766 | 6/1984 | European Pat. Off. |
| 2814431 | 10/1979 | Fed. Rep. of Germany |
| 3119488 | 3/1982 | Fed. Rep. of Germany |
| 3146817 | 6/1983 | Fed. Rep. of Germany |
| 3222760 | 1/1984 | Fed. Rep. of Germany |
| 3301903 | 7/1984 | Fed. Rep. of Germany |
| 3318424 | 11/1984 | Fed. Rep. of Germany |
| 1079508 | 8/1967 | United Kingdom |
| 2023248 | 12/1979 | United Kingdom |
| 2097080 | 10/1982 | United Kingdom |

OTHER PUBLICATIONS

A. J. Young, "Inertia Valves for Braking Systems", Imecle 1983, pp. 19-24.

Primary Examiner—Duane A. Reger
Attorney, Agent, or Firm—Larry J. Palguta; Ken C. Decker

[57] ABSTRACT

A proportioning valve (10, 110) in a master cylinder housing (12, 112) is pressure responsive to control the flow of fluid to a wheel brake cylinder. The proportioning valve (10, 110) is connected to a fluid channel (31, 131) opening into the master cylinder reservoir (13, 113), a second valve (34, 134) being disposed at the opening (32, 132) and being engaged by an inertia sensitive ball (40, 140) located on a ramp (17, 117). The ball (40, 140) is responsive to deceleration of the vehicle whereby the ball (40, 140) moves up the ramp (17, 117) and permits the second valve (34, 134) to close. Closure of the second valve (34, 134) prevents fluid communication between the fluid reservoir (13, 113) and the proportioning valve (10, 110) in order to vary the outlet pressure ($P_{Out}$) of the proportioning valve (10, 110) in response to deceleration of the vehicle. The proportioning valve (10, 110) may be contained completely within the housing (12, 112) of the master cylinder (10, 110).

65 Claims, 7 Drawing Figures

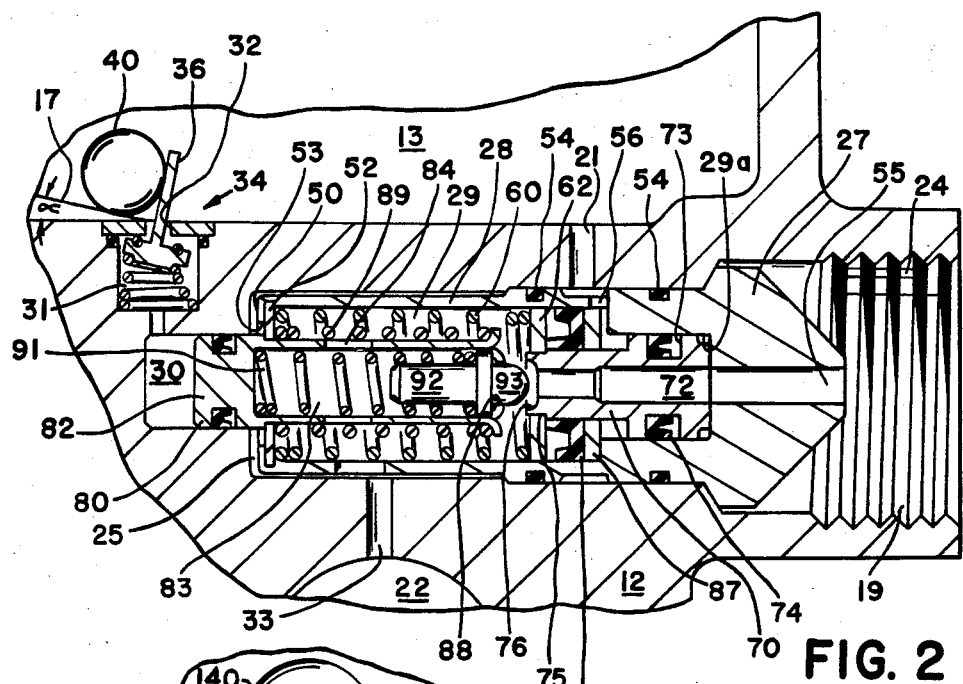
FIG. 2
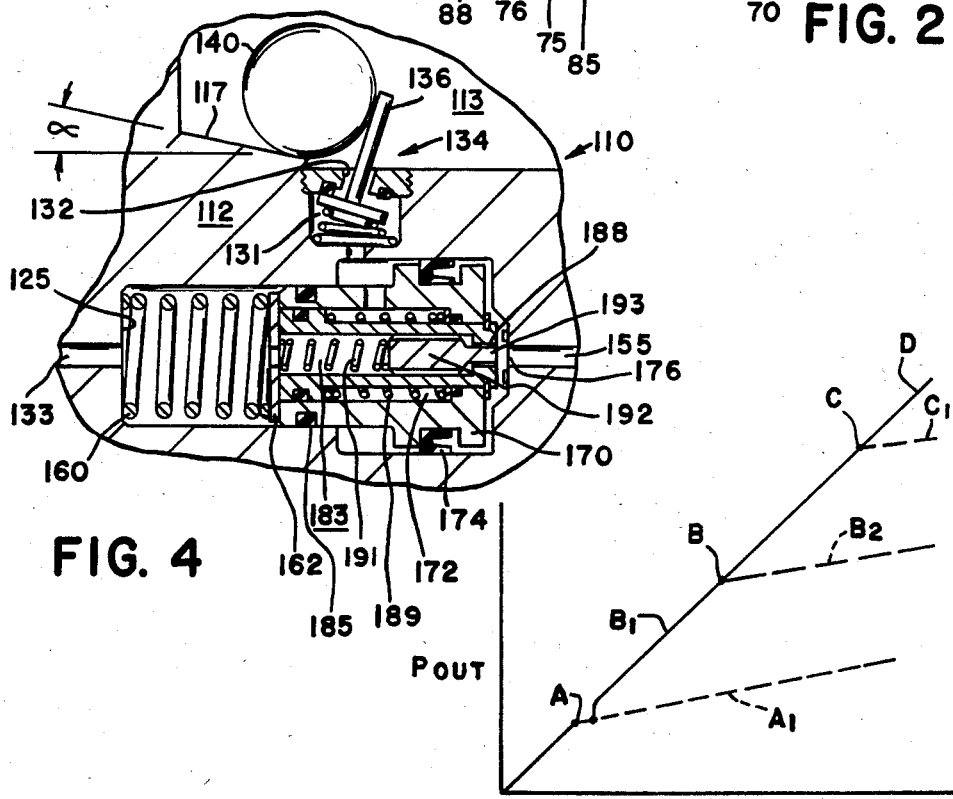
FIG. 4
FIG. 5

DECELERATION AND PRESSURE SENSITIVE PROPORTIONING VALVE

This invention relates to a deceleration sensitive proportioning valve for the brake system of a vehicle.

During a braking application for a vehicle, the body of the vehicle transfers a significant portion of the weight of the vehicle to the front wheels. Therefore, the traction of the rear wheels is reduced so that if equal pressures are communicated to the front and rear wheel brakes, the rear wheels will skid or lock-up to create an unsafe driving condition. In order to minimize lock-up of the rear wheels, the prior art has provided many forms of proportioning valves to restrict communication of pressurized fluid to the rear wheels in response to increased brake fluid pressure and braking.

The prior art has provided an inertia sensing mass which generates a force in response to vehicle deceleration. The force of the inertia sensing mass is transmitted to the proportioning valve to modify the restriction of pressurized fluid to the rear wheels. The inertia sensing mass is provided to account for the loaded condition of the vehicle, because the loaded vehicle will experience less deceleration than an unloaded vehicle, given one level of pressurized brake fluid.

In prior art inertia sensing proportioning valves, the inertia sensing mass is generally disposed within the fluid path connecting the master cylinder with the wheel cylinder, or is movable to impart positive movement to the proportioning valve assembly. Consequently, the inertia sensing mass is subject to temperature and viscosity changes of the brake fluid, to vibrations, and to changes in fluid flow which may cause in response thereto undesired movement of the inertia sensing mass. Additionally, inertia sensing valves provide typically a narrow range of response characteristics, and as a result impose an inherent limitation on the output pressures that may be achieved by such valves.

The present invention relates to an inertia and pressure sensing proportioning valve for a vehicle. The proportioning valve provides an inertia sensing object which is not disposed within the fluid flow path existing between the master cylinder and the wheel cylinder, and therefore is not subject to vibration, changes in temperature and viscosity, or fluid flow. The proportioning valve comprises a tube seat housing mounted within a bore in the housing of the master cylinder, and a channel in the body of the master cylinder and which provides fluid communication between the proportioning valve and the reservoir. A second valve is disposed in the channel at the opening of the channel into the reservoir, and the second valve is held open by a ball disposed on a ramp at the base of the reservoir. The tube seat housing has an outlet for fluid communication with a brake wheel cylinder of the vehicle and an inlet opening for fluid communication with the brake master cylinder. The tube seat housing has an interior cavity with a differential piston disposed at one end thereof by means of a first coil spring. A second piston is disposed at the other end of the tube seat housing and extends into the channel which communicates with that end of the tube seat housing, the second piston being biased towards the interior of the housing by means of a second coil spring. The second piston has an interior cavity with an end opening, a poppet valve being biased by a third spring into engagement with the end opening. An end of the poppet valve protrudes outwardly from the second piston to be positioned adjacent a through opening of the differential piston. Movement of the pistons relative to each other results in restriction of fluid flowing through the first piston to the outlet port, and deceleration of the vehicle results in closure of the second valve which prevents further movement of the second piston and thereby effects the restriction of fluid communicated to the outlet port at a higher pressure level. Increased application pressures cause displacement of the second piston and require the differential piston to travel further to effect restriction of fluid flowing through the outlet port, which results in an increased range of response characteristics including higher output pressures.

The accompanying drawings show, for the purpose of exemplification without limiting the invention or the claims thereto, certain practical embodiments illustrating the principles of this invention wherein:

FIG. 2 illustrates a proportioning valve of FIG. 1 with the second valve and inertia sensitive ball being rotated ninety degrees (90°) relative to the proportioning valve, in order to assist in illustrating how the valve functions;

FIG. 4 is a sectional view of an alternative embodiment of the proportioning valve of the present invention, also with the inertia sensitive second valve rotated ninety degrees (90°);

FIG. 5 is a graph of $P_{Out}$ vs $P_{In}$ for the proportioning valve of the present invention.

Figure 1:
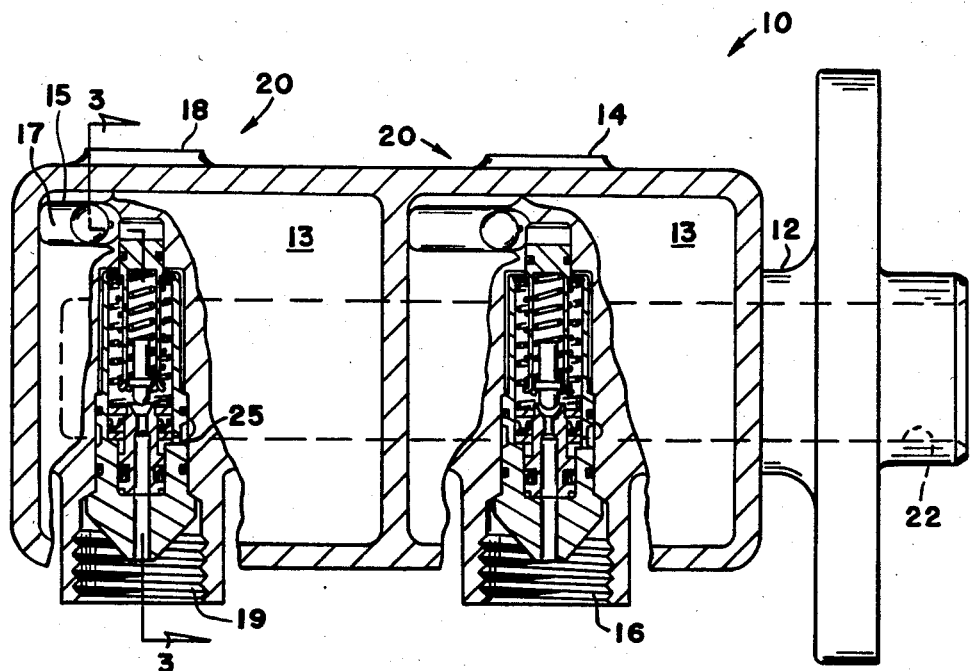
FIG. 1 illustrates two proportioning valves of the present invention disposed within the body of a master cylinder housing.
Figure 6:
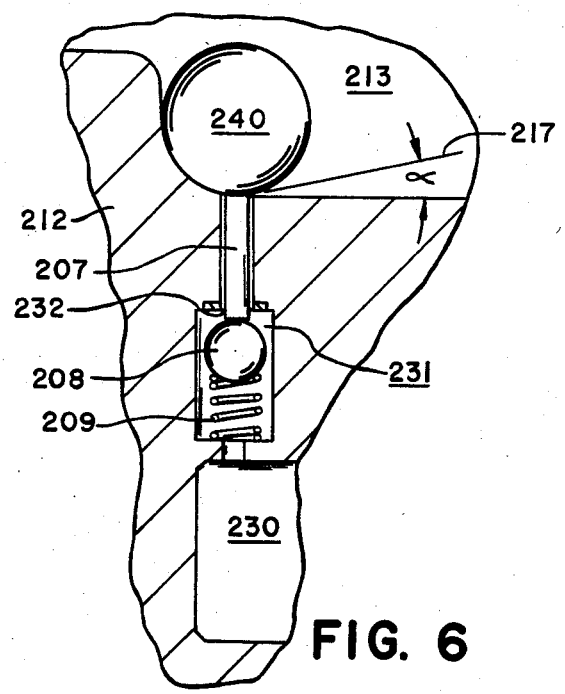
FIGS. 6 and 7 illustrate alternative embodiments in a valve positioned between the proportioning valve and fluid reservoir.
Figure 7:
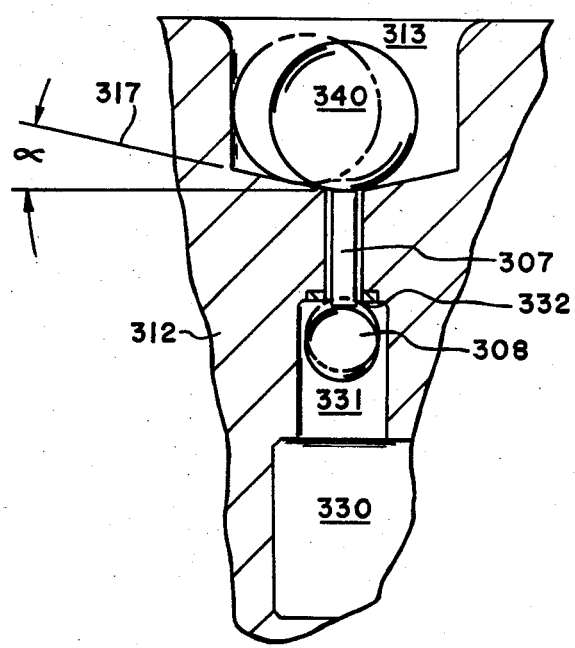

Referring to FIG. 1, the master cylinder of a vehicle is designated generally by reference numeral 10. Located within housing 12 of master cylinder 10, are two proportioning valves designated generally by the reference numeral 20. Master cylinder 10 is for a split braking circuit having a fluid pressure outlet 14 communicating with a front wheel cylinder and a fluid pressure outlet 16 communicating with a rear wheel cylinder. Likewise, fluid pressure outlets 18 and 19 communicate, respectively, with the wheel cylinders or disc brakes of front and rear wheels. Each set of front and rear outlets includes a proportioning valve 20. The master cylinder includes a bore 22 communicating with the bore 25 of fluid outlet 19. Bore 25 includes a tube seat housing 27 maintained in bore 25 by the brake line tube (not shown) which threadably engages tube outlet 19 at threads 24. Bore 25 communicates with a cavity 30 and channel 31 that communicate with a master cylinder reservoir or fluid-containing chamber 13, channel 31 (see FIGS. 2 and 3) including an opening 32 comprising the opening of a second valve 34 which is illustrated as a tilt valve. It should be clearly understood that second valve 34 may comprise any one of numerous valve constructions which would function appropriately as part of the present invention. FIGS. 6 and 7 illustrate example alternative embodiments for the valve 34. An inertia sensitive ball 40 is located within a groove 15 located at the bottom of brake fluid reservoir 13. The ball rests on a ramp 17 which is disposed at an angle alpha oriented upwardly towards the front of the vehicle (in FIGS. 2 and 4 the tilt valve and ball have been rotated ninety degrees (90°) for illustrational purposes). Second or tilt valve 34 includes arm 36 engaged by inertia sensitive ball 40; inertia sensitive ball 40 holds the tilt valve open until a certain predetermined attitude is attained by the vehicle during deceleration or when deceleration displaces ball 40 up ramp 17.

Tube seat housing 27 includes a longitudinal housing 28 having a flanged but open end 50 which retains in place a washer 52. End 50 includes opening 53 adjacent a cavity 30 and interior cavity 29. Annular seals 54 are disposed between the seat housing and bore 25. Housing opening 56 provides communication with a master cylinder vent 21 communicating with fluid reservoir 13. Tube seat housing 27 contains an outlet opening 55 permitting fluid communication through bore 22, inlet 33, bore 25 and fluid outlet 19. Washer 52 serves as a seat for a first coil spring 60 biasly engaging movable washer 62 receiving an end 75 of differential piston 70. Differential piston 70 has a through center opening 72 communicating with outlet opening 55, and an annular recess 73 with U-shaped annular seal 74 which engages tube seat housing stepped bore portion 29a. The differential piston 70 includes a poppet valve seat 76 whose exterior perimeter comprising end 75 is received within the opening of washer 62, and an additional seal 85 and washer 87 are disposed adjacent washer 62 and about differential piston 70. Extending through opening 53 at end 50 of tube housing 28 is a second piston 80 having one end 82 received within cavity 30 and the other end extending within interior cavity 29. Piston 80 has an interior cavity 83 with fluid communication openings 84 and poppet valve opening 88. A second coil spring 89 is seated against washer 52 and biases a flange at the other end of second piston 80 in order to bias piston 80 inwardly of cavity 29. Interior cavity 83 has disposed therein a third coil spring 91 biasing a poppet valve 92 into engagement with poppet valve opening 88. Valve seat end 93 of poppet valve 92 is disposed adjacent poppet valve seat 76.

It should be clearly understood that proportioning valve 20 may comprise other forms of proportioning valves suitable for mounting within a bore of the master cylinder housing. Other contemplated forms of proportioning valves would operate in accordance with the general principles applicable to pressure responsive proportioning valves used in brake circuits, and would be used in conjunction with a deceleration sensitive valve such as tilt valve 34 illustrated in FIG. 1.

Figure 3:
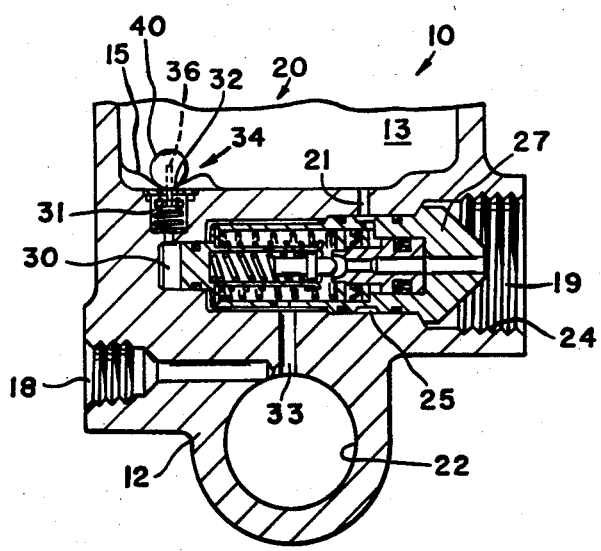
FIG. 3 is a cross sectional view taken along view lines 3—3 of FIG. 1.

Proportioning valve 20 operates in accordance with the pressure curves illustrated in FIG. 5. Referring to FIGS. 2 and 3, as pressure from master cylinder bore 22 is communicated via inlet 33 to bore 25, valve seat 76 is open and allows the input pressure ($P_{In}$) to equal the output pressure ($P_{Out}$) at outlet opening 55 and outlet 19. The input pressure rises as the operator applies the vehicle brakes and when it attains a pressure level sufficient to displace differential piston 70 (differential piston 70 having a larger effective surface area at its right end than at the left end where valve seat 76 is located), then differential piston 70 moves to the left toward valve seat end 93 which causes restriction of fluid flow through valve seat 76 and outlet opening 55. This establishes the first break point A illustrated on the graph of FIG. 5. If deceleration of the vehicle is sufficient to cause the inertia sensitive ball 40 to roll up ramp 17 (indicating an unloaded vehicle), then tilt valve 34 closes and the closed channel 31 would prevent movement to the left of second piston 80. As a result, the poppet valve 92 remains stationary so that end 93 restricts seat 76. The input pressure ($P_{In}$) to output pressure ($P_{Out}$) relationship would follow the curve $A_1$ indicative of the output pressures communicated to the rear wheel brake cylinders of an unloaded vehicle.

If deceleration of the vehicle is insufficient because the vehicle is loaded and thereby prevents tilting of the vehicle and/or displacement of ball 40 up ramp 17, tilt valve 34 remains open and increased input pressure ($P_{In}$) will cause second piston 80 to move to the left against second coil spring 89. As second piston 80 moves left, poppet valve 92 moves therewith to retract seat end 93 away from valve seat 76 and allow the increase in input pressure ($P_{In}$) to be communicated through opening 55 and outlet 19 to the associated rear brake wheel cylinder. This results in an increase in the output pressure corresponding to curve $B_1$ of FIG. 5. The increased output pressure ($P_{Out}$) provided to the wheel cylinders of the rear brakes will cause an increase in deceleration of the vehicle such that ball 40 moves up ramp 17 and permits closure of tilt valve 34. Closure of tilt valve 34 prevents any fluid communication through cavity 30 and channel 31 to reservoir 13, and thereby prevents second piston 80 from moving any further to the left. Piston 70 will move to the left in accordance with the increase in the input pressure received from the master cylinder, until seat 76 again approaches the valve seat end 93 and establishes the higher level break point B for a loaded vehicle. The restriction of fluid flow through valve seat 76 by valve seat end 93 results in the pressure curve labeled $B_2$ in FIG. 5.

An important feature of the present invention is the ability of the deceleration and pressure sensitive proportioning valve to provide higher output pressures such as those illustrated in FIG. 5. An inertia sensing valve produces pressure output characteristics or curves that fall within a lower range of output pressures than those illustrated in FIG. 5. The combination of pressure and deceleration sensing enables the advantages and performance provided by the present invention.

The proportioning valve of the present invention does not require a bypass because in a split braking circuit having a master cylinder utilizing two of the proportioning valves, or in an axle-axle split system with one proportioning valve, an inherent bypass is provided. If one of the branches of the split circuit should fail, then there would be less deceleration of the vehicle and the tilt valve of the operation branch would stay open so that higher brake fluid pressure received from the master cylinder can be communicated to the associated brake cylinders. Thus, in case of failure higher brake pressures can be communicated to the associated brake wheel cylinders to effect braking of the vehicle, and likewise for a system with a single proportioning valve. Curve $B_2$ represents also the inherent bypass function characteristic for an unloaded vehicle, while breakpoint C and curve $C_1$ represent the bypass characteristic for a loaded vehicle. Also, by providing for greater travel of the second piston than for the differential piston, curve "D" may be obtained.

Turning now to FIG. 4, there is illustrated an alternative embodiment of the proportioning valve of the present invention. Like structural components are indicated by the same numerals increased by 100. The master cylinder housing 112 contains a bore 125 having a first spring 160 engaging one end of the bore and a washer 162. Inlet 133 provides communication between the master cylinder bore (not shown) and bore 125. The spring 160 and washer 162 bias a differential piston 170 having seals 174 and 185. Piston 170 includes an interior through opening 172 which has disposed therein a second or inner piston 180. Second piston 180 is biased against washer 162 by a spring 189 and contains an interior cavity 183 having a poppet valve 192 with seat end 193 received within opening 188 of second piston 180. Third coil spring 191 is seated against washer 162 to bias poppet valve 192 to the right of FIG. 4. A channel 131 provides communication for fluid pressure through opening 132 of tilt valve 134 engaged by inertia sensitive ball 140 disposed upon ramp 117 in master cylinder fluid reservoir 113.

The proportioning valve 110 illustrated in FIG. 4 operates in a manner similar to that explained above for the previous embodiment, and effects pressure curves similar to those illustrated in FIG. 5. When the vehicle is unloaded, an increase in brake pressure ($P_{In}$) is communicated to bore 125 and permits fluid pressure to be communicated through interior cavity 183 and opening 188 to the outlet opening 155 which communicates fluid pressure to the brake wheel cylinder of a rear wheel. An increase in $P_{In}$ results in piston 170 moving toward the left against the force of spring 160. As piston 170 moves to the left, second piston 180 moves with it and results in the restriction of valve opening 188 to establish the first break point A illustrated in FIG. 5, and effecting the subsequent pressure curve A1 after closure of tilt valve 134 if there is sufficient deceleration of the vehicle. If there is insufficient deceleration of the vehicle wherein tilt valve 134 does not close, then the continued increase in the brake pressure communicated to the rear wheels corresponds to the pressure curve $B_1$ of FIG. 5, the pressure increase causing the second piston 180 to move to the right of FIG. 4 so that valve opening 188 opens and effects pressure curve $B_1$. When sufficient deceleration is attained, ball 140 moves up ramp 117 to permit closure of tilt valve 134. This effects closure of the channel 131 so that fluid pressure may not be communicated through the channel to reservoir 113 and thereby prevents pistons 170 and 180 from further movement. This establishes the second break point B which occurs when the vehicle is loaded and sufficient pressure has been reached such that poppet valve 192 moves to the right to cause restriction of the valve opening 188 and effect the pressure curve $B_2$. The inherent bypass provision explained above is present with this alternative embodiment when there is a failure of the primary master cylinder system.

In view of the above-described embodiments, it is obvious that modification of the characteristic parameters, i.e., spring rates, ramp angle, mass of inertia sensitive object, spring loads, etc., for the present invention results in the curves and characteristics of FIG. 5 being infinitely variable according to design preference and customer needs.

FIGS. 6 and 7 represent example alternative embodiments of deceleration-sensing valves that may be used to close the channel between the pressure responsive proportioning valve and fluid reservoir. In FIG. 6, inertia sensitive ball 240 is located on ramp 217 located in reservoir 213. The weight and position of ball 240 depresses pin 207 and ball valve 208 against spring 209 in channel 231 which communicates with cavity 230. Deceleration of the vehicle can displace ball 240 upwardly along ramp 217 and allow pin 207 and ball valve 208 to move upwardly to close opening 232 of channel 231. FIG. 7 illustrates an inertia sensitive ball 340 disposed on ramp 317 and depressing pin 307 and buoyant hollow ball 308. Sufficient deceleration of the vehicle causes ball 340 to move up ramp 317 so that pin 307 is displaced upwardly by buoyant hollow ball 308 which closes opening 332 of channel 331. The deceleration or inertia sensing valves of FIGS. 6 and 7 illustrate that many different designs may be utilized to provide an inertia sensing valve able to operate cooperatively with a pressure response proportioning valve to effect the advantages and performance of the present invention.

Although this invention has been described in connection with the illustrated embodiments, it will be obvious to those skilled in the art that various changes may be made in the form, structure, and arrangement of parts without departing from the invention.

I claim:

1. In an incompressible fluid proportioning valve assembly for a vehicle having an inlet communicating with a fluid pressure source and an outlet communicating with a brake assembly, an incompressible fluid pressure responsive assembly cooperating with the inlet and the outlet to vary fluid communication therebetween in response to pressurized fluid communicated to the inlet, and an inertia sensing mass responsive to deceleration of the vehicle and cooperating with the incompressible fluid pressure responsive assembly to assist in the variation of fluid communication between the inlet and outlet, the improvement comprising a channel communicating with the pressure responsive assembly and a fluid reservoir, and valve means disposed in said channel and engaged by said inertia sensing mass, the inertia sensing mass being responsive to deceleration of the vehicle to effect operation of said valve means to prevent fluid communication with the reservoir through the channel and thereby cooperate with the pressure responsive assembly in the variance of fluid communicated to said outlet.

2. The proportioning valve assembly in accordance with claim 1, wherein said inertia sensing mass comprises an annular object and said valve means comprises a tilt valve, so that deceleration of the vehicle causes said annular object to move away from said tilt valve and permit closure thereof.

3. The proportioning valve assembly in accordance with claim 1, further comprising a master cylinder body, the proportioning valve assembly being disposed within said body.

4. In a proportioning valve assembly for a vehicle having an inlet communicating with a fluid pressure source and an outlet communicating with a brake assembly, a pressure responsive assembly cooperating with the inlet and the outlet to vary fluid communication therebetween in response to pressurized fluid communicated to the inlet, and an inertia-sensing mass responsive to deceleration of the vehicle and cooperating with the pressure responsive assembly to assist in the variation of fluid communication between the inlet and outlet, the improvement comprising a channel communicating with the pressure responsive assembly and a fluid reservoir, valve means disposed in said channel and engaged by said inertia-sensing mass, the inertia-sensing mass being responsive to deceleration of the vehicle to effect operation of said valve means to prevent fluid communication with the reservoir through the channel and thereby cooperate with the pressure responsive assembly in the variance of fluid communicated to said outlet, the pressure responsive assembly including in a bore of the assembly a differential piston, a second piston located for movement relative to the differential piston and having an interior cavity, and poppet valve means disposed within the interior cavity.

5. The proportioning valve assembly in accordance with claim 1, wherein said inertia sensing mass comprises an annular object.

6. The proportioning valve assembly in accordance with claim 5, wherein said valve means comprises a spring that biases seat closure means toward a valve seat in said channel and against a pin engaging said annular object.

7. The proportioning valve assembly in accordance with claim 5, wherein said valve means comprises a buoyant object separated from a valve seat in said channel by a pin engaging said annular object.

8. The proportioning valve assembly in accordance with claim 4, wherein said second piston extends into said channel and is responsive to operation of said valve means.

9. The proportioning valve assembly in accordance with claim 4, further comprising a tube seat housing containing said pistons and poppet valve means, to provide a removable cartridge assembly.

10. The proportioning valve assembly in accordance with claim 4, wherein the differential and second pistons are disposed opposite one another with the poppet valve means extending from said second piston toward said differential piston.

11. The proportioning valve assembly in accordance with claim 4, wherein the second piston is disposed within an opening in said differential piston and the poppet valve means extends from said opening toward said outlet.

12. The proportioning valve assembly in accordance with claim 4, further comprising a spring biasing said poppet valve means toward said outlet, resilient means acting on said second piston, and spring means biasing said differential piston toward an end of said bore.

13. The proportioning valve assembly in accordance with claim 12, wherein said resilient means biases said second piston away from said channel.

14. The proportioning valve assembly in accordance with claim 8, wherein the second piston sealingly encloses said channel and is biased away from said channel by resilient means.

15. The proportioning valve assembly in accordance with claim 13, further comprising an intermediate member disposed between said spring means and differential piston, the intermediate member having a hole communicating with said interior cavity.

16. The proportioning valve assembly in accordance with claim 4, wherein said inertia-sensing mass comprises an annular object and said valve means comprises a tilt valve, so that deceleration of the vehicle causes said annular object to move away from said tilt valve and permit closure thereof.

17. The proportioning valve assembly in accordance with claim 4, further comprising a master cylinder body, the proportioning valve assembly being disposed within said body.

18. The proportioning valve assembly in accordance with claim 4, wherein said inertia-sensing mass comprises an annular object.

19. The proportioning valve assembly in accordance with claim 18, wherein said valve means comprises a spring that biases seat closure means toward a valve seat in said channel and against a pin engaging said annular object.

20. The proportioning valve assembly in accordance with claim 18, wherein said valve means comprises a buoyant object separated from a valve seat in said channel by a pin engaging said annular object.

21. A pressure reducing valve assembly for a vehicle braking system, comprising a housing having an inlet and an outlet, a differential piston in said housing and subject to inlet and outlet pressures so that the valve assembly provides a pressure at said outlet reduced from the pressure at said inlet, a second piston disposed within said housing and movable relative to said differential piston, said second piston having an interior cavity, poppet valve means disposed within the interior cavity of said second piston and extendable therefrom, channel means for connecting the inside of said housing with a fluid reservoir, second valve means disposed in said channel means, and an inertia sensitive object engaging said second valve means, the inertia sensitive object being responsive to deceleration of the vehicle to permit said second valve means to close to prevent fluid communication with said reservoir and thereby cooperate in reducing the pressure at said outlet.

22. The pressure reducing valve assembly in accordance with claim 21, wherein said housing comprises a master cylinder housing.

23. The pressure reducing valve assembly in accordance with claim 21, wherein the inertia sensitive object is disposed within said reservoir and deceleration causes said object to move away from said second valve means.

24. The pressure reducing valve assembly in accordance with claim 21, wherein said second valve means comprises a tilt valve biased in an open position by said inertia sensitive object when said vehicle is not decelerating.

25. The pressure reducing valve assembly in accordance with claim 21, wherein said valve assembly is responsive to unloaded and loaded conditions of said vehicle by means of said second valve means and inertia sensitive object.

26. The pressure reducing valve assembly in accordance with claim 21, wherein said second valve means comprises a spring that biases seat closure means toward a valve seat in said channel means and against a pin engaging said object.

27. The pressure reducing valve assembly in accordance with claim 21, wherein said second valve means comprises a buoyant object separated from a valve seat in said channel means by a pin engaging said object.

28. The pressure reducing valve assembly in accordance with claim 21, wherein said second piston extends into said channel means and is responsive to operation of said second valve means.

29. The pressure reducing valve assembly in accordance with claim 21, further comprising a tube seat housing containing said pistons and poppet valve means, to provide a removable cartridge assembly.

30. The pressure reducing valve assembly in accordance with claim 21, wherein the differential and second pistons are disposed opposite one another with the poppet valve means extending from said second piston toward said differential piston.

31. The pressure reducing valve assembly in accordance with claim 21, wherein the second piston is disposed within an opening in said differential piston and the poppet valve means extends from said opening toward said outlet.

32. The pressure reducing valve assembly in accordance with claim 21, further comprising a spring biasing said poppet valve means toward said outlet, resilient means acting on said second piston, and spring means biasing said differential piston toward an end of said housing.

33. The pressure reducing valve assembly in accordance with claim 32, wherein said resilient means biases said second piston away from said channel means.

34. The pressure reducing valve assembly in accordance with claim 28, wherein the second piston sealingly encloses said channel means and is biased away from said channel means by resilient means.

35. A pressure reducing valve assembly for a vehicle braking system, comprising a housing having an inlet and an outlet, a first piston in said housing and subject to inlet and outlet pressures so that the valve assembly provides a pressure at said outlet reduced from the pressure at said inlet, spring means biasing said first piston toward an end of said housing, a second piston disposed within said housing and movable relative to said first piston, said second piston having an interior cavity, resilient means acting on said second piston, poppet valve means disposed within the interior cavity of said second piston and extendable therefrom, a spring biasing said poppet valve means toward said outlet, channel means for connecting the inside of said housing with a fluid reservoir, second valve means disposed in said channel and including a spring that biases seat closure means toward a valve seat in said channel means, and an inertia sensitive object engaging said second valve means, the inertia sensitive object disposed within said reservoir and decelertion causing said object to move away from said second valve means which closes to prevent fluid communication with said reservoir and thereby cooperate in reducing pressure at said outlet, the valve assembly being responsive to unloaded and loaded conditions of said vehicle by means of said second valve means and inertia sensitive object.

36. In a proportioning valve assembly for a vehicle having an inlet communicating with a fluid pressure source and an outlet communicating with a brake assembly, a pressure responsive assembly cooperating with the inlet and the outlet to vary fluid communication therebetween in response to pressurized fluid communicated to the inlet, and an inertia-sensing mass responsive to deceleration of the vehicle and cooperating with the pressure responsive assembly to assist in the variation of fluid communication between the inlet and outlet, the improvement comprising a channel communicating with the pressure responsive assembly and a fluid-containing chamber, valve means disposed in said channel and engaged by said inertia-sensing mass, the inertia-sensing mass being responsive to deceleration of the vehicle to effect operation of said valve means to prevent fluid communication with the fluid-containing chamber through the channel and thereby cooperate with the pressure responsive assembly in the variance of fluid communicated to said outlet, the pressure responsive assembly including in a bore of the assembly a differential piston, a second piston located for movement relative to the differential piston, and poppet valve means disposed for movement relative to the differential piston.

37. The proportioning valve assembly in accordance with claim 36, wherein said inertia-sensing mass comprises an annular object and said valve means comprises a tilt valve, so that deceleration of the vehicle causes said annular object to move away from said tilt valve and permit closure thereof.

38. The proportioning valve assembly in accordance with claim 36, further comprising a master cylinder body, the proportioning valve assembly being disposed within said body.

39. The proportioning valve assembly in accordance with claim 36, wherein said inertia-sensing mass comprises an annular object.

40. The proportioning valve assembly in accordance with claim 39, wherein said valve means comprises a spring that biases seat closure means toward a valve seat in said channel and against a pin engaging said annular object.

41. The proportioning valve assembly in accordance with claim 39, wherein said valve means comprises a buoyant object separated from a valve seat in said channel by a pin engaging said annular object.

42. The proportioning valve assembly in accordance with claim 36, wherein said second piston extends into said channel and is responsive to operation of said valve means.

43. The proportioning valve assembly in accordance with claim 42, wherein the second piston sealingly encloses said channel and is biased away from said channel by resilient means.

44. The proportioning valve assembly in accordance with claim 36, further comprising a tube seat housing containing said pistons and poppet valve means, to provide a removable cartridge assembly.

45. The proportioning valve assembly in accordance with claim 36, wherein the differential and second pistons are disposed opposite one another with the poppet valve means extending from said second piston toward said differential piston.

46. The proportioning valve assembly in accordance with claim 36, wherein the second piston is disposed within an opening in said differential piston and the poppet valve means extends toward said outlet.

47. The proportioning valve assembly in accordance with claim 36, further comprising a spring biasing said poppet valve means toward said outlet, resilient means acting on said second piston, and spring means biasing said differential piston toward an end of said bore.

48. The proportioning valve assembly in accordance with claim 46, wherein said resilient means biases said second piston away from said channel.

49. The proportioning valve assembly in accordance with claim 48, wherein the second piston has an interior cavity with the poppet valve means disposed therein.

50. The proportioning valve assembly in accordance with claim 48, further comprising an intermediate member disposed between said spring means and differential piston, the intermediate member having a hole communicating with said interior cavity.

51. A pressure reducing valve assembly for a vehicle braking system, comprising a housing having an inlet and an outlet, a differential piston in said housing and subject to inlet and outlet pressures so that the valve assembly provides a pressure at said outlet reduced from the pressure at said inlet, a second piston disposed within said housing and movable relative to said differential piston, poppet valve means disposed in the housing for movement relative to the differential piston, channel means for connecting the inside of said housing with a fluid-containing chamber, second valve means disposed in said channel means, and an inertia sensitive object engaging said second valve means, the inertia sensitive object being responsive to deceleration of the vehicle to permit said second valve means to close to prevent fluid communication with said fluid-containing chamber and thereby cooperate in reducing the pressure at said outlet.

52. The pressure reducing valve assembly in accordance with claim 51, wherein said housing comprises a master cylinder housing.

53. The pressure reducing valve assembly in accordance with claim 51, wherein the inertia sensitive object is disposed within said fluid-containing chamber and deceleration causes said object to move away from said second valve means.

54. The pressure reducing valve assembly in accordance with claim 51, wherein said second valve means comprises a tilt valve biased in an open position by said inertia sensitive object when said vehicle is not decelerating.

55. The pressure reducing valve assembly in accordance with claim 51, wherein said valve assembly is responsive to unloaded and loaded conditions of said vehicle by means of said second valve means and inertia sensitive object.

56. The pressure reducing valve assembly in accordance with claim 51, wherein said second valve means comprises a spring that biases seat closure means toward a valve seat in said channel means and against a pin engaging said object.

57. The pressure reducing valve assembly in accordance with claim 51, wherein said second valve means comprises a buoyant object separated from a valve seat in said channel means by a pin engaging said object.

58. The pressure reducing valve assembly in accordance with claim 51, wherein said second piston extends into said channel means and is responsive to operation of said second valve means.

59. The pressure reducing valve assembly in accordance with claim 58, wherein the second piston sealingly encloses said channel means and is biased away from said channel means by resilient means.

60. The pressure reducing valve assembly in accordance with claim 51, further comprising a tube seat housing containing said pistons and poppet valve means, to provide a removable cartridge assembly.

61. The pressure reducing valve assembly in accordance with claim 51, wherein the differential and second pistons are disposed opposite one another with the poppet valve means extending from said second piston toward said differential piston.

62. The prssure reducing valve assembly in accordance with claim 51, wherein the second piston is disposed within an opening in said differential piston and the poppet valve means extends toward said outlet.

63. The pressure reducing valve assembly in accordance with claim 51, further comprising a spring biasing said poppet valve means toward said outlet, resilient means acting on said second piston, and spring means biasing said differential piston toward an end of said housing.

64. The pressure reducing valve assembly in accordance with claim 63, wherein said resilient means biases said second piston away from said channel means.

65. The pressure reducing valve assembly in accordance with claim 51, wherein said second piston includes an interior cavity and said poppet valve means is disposed within the interior cavity of said second piston and extendible therefrom.

* * * * *